United States Patent [19]

Kumagai

[11] Patent Number: 4,484,080
[45] Date of Patent: Nov. 20, 1984

[54] SHAPE DETECTING DEVICE

[75] Inventor: Takashi Kumagai, Tokyo, Japan

[73] Assignees: Shinko Engineering Research Corp.; Mamiya Koki Kabushiki Kaisha (Mamiya Camera Co., Ltd.), both of Tokyo, Japan

[21] Appl. No.: 402,411

[22] Filed: Jul. 27, 1982

Related U.S. Application Data

[63] Continuation of Ser. No. 130,052, Mar. 14, 1980, abandoned.

[30] Foreign Application Priority Data

Mar. 15, 1979 [JP] Japan .................................. 54-29440

[51] Int. Cl.³ ............................................ G01N 21/86
[52] U.S. Cl. ..................................... 250/560; 356/394
[58] Field of Search ............... 250/560, 561, 208, 209, 250/214 R, 216; 356/391–394, 376, 381, 383–387

[56] References Cited

U.S. PATENT DOCUMENTS

| | | | |
|---|---|---|---|
| 3,436,555 | 4/1969 | Foster ................................ | 356/376 |
| 3,737,856 | 6/1973 | Lehrer et al. ...................... | 250/560 |
| 4,037,103 | 7/1977 | Ryden ................................ | 250/560 |
| 4,088,411 | 5/1978 | Ahlquist et al. ................... | 250/560 |
| 4,160,599 | 7/1979 | Sperrazza ........................... | 250/560 |

Primary Examiner—David C. Nelms
Attorney, Agent, or Firm—Cushman, Darby & Cushman

[57] ABSTRACT

A detecting device comprising a projecting optical system for focusing the image of an object to be examined on a focusing glass, a plurality of photoelectric elements which can be set in proper positions on the focusing glass, circuits including level adjusting circuits and for converting outputs from the respective photoelectric elements to binary logical outputs and circuits for converting these binary logical inputs to octonary logical outputs so that the slightest variations of the shape and state of the object can be easily and accurately detected. The respective photoelectric elements can be moved out of the projecting light path as required. The projecting optical system consists of an objective lens system and a projecting lens system so that a magnified erecting image of the object can be obtained on the focusing glass.

4 Claims, 9 Drawing Figures

SHAPE DETECTING DEVICE

This application is a continuation of my copending application Ser. No. 130,052 filed Mar. 14, 1980 which was abandoned upon the filing of this continuation application.

BACKGROUND OF THE INVENTION (a) Field of the Invention

This invention relates to detecting devices and more particularly to a device for detecting variations of the shape and kind of an object to be examined wherein the light amounts of the respective portions of the image of the object as projected on a focusing glass by an objective are converted to electric signals by photoelectric converting elements and the signals are treated.

(b) Description of the Prior Art

For example, on an automatic assembling line, as the uniformity of component parts to be assembled is required, the component parts fed on the assembling line must be always examined and those out of the standards in respect of the shape and material must be removed out of the line. Also, in an automatic charging system for charging a container with a fixed amount of such liquid as a drink or chemical solution, it is necessary to examine whether the container is charged with a predetermined amount of the liquid when or after the charging is completed.

The detecting device of this kind can be conveniently used in such automatic assembling line and automatic charging system as are described above. Various types of the detecting device of this kind have been already suggested and can be largely classified into two kinds. That is to say, one of them is a system wherein many photoelectric converting elements are arranged on the entire focusing plane of an object to be examined and electric signals from the respective elements are taken out in turn and are treated through electronic circuits. The other is a system wherein an image is scanned with one or a comparatively few photoelectric converting elements and electric signals coming out of them are treated through electronic circuits.

In the former type, in order that the slightest variation of the object or image may be positively detected, many elements must be densely arranged. In the latter type, as it takes some time to scan the entire focusing plane and the electric signals continuously taken out of the elements must be treated in turn, in order to detect the variation of the image, there is required a device for memorizing the electric signals taken out of the respective portions of the entire image plane. For such reasons, both of the conventional detecting devices have defects that the formation is complicated and the price is high.

SUMMARY OF THE INVENTION

A primary object of the present invention is to provide a detecting device of this kind wherein a comparatively few photoelectric elements are arranged so as to be able to be freely set in any positions on an image plane, the light amount detecting level of each element is made adjustable and the output signal from each element is converted from a binary system to be of a multinary system so that even the slightest variation of an object to be examined can be sensitively caught.

Another object of the present invention is to provide a detecting device of this kind wherein a plurality of photoelectric elements can be removed from the plane of the focusing glass by a manual operation as required to facilitate the observation of the image of an object to be examined.

A further object of the present invention is to provide a detecting device of this kind wherein the image of an object to be examined can be projected on a focusing glass as a magnified erecting image.

These and other objects of the present invention will become more apparent during the course of the following detailed description and appended claims.

DESCRIPTION OF THE PREFERRED EMBODIMENT

Figure 1:
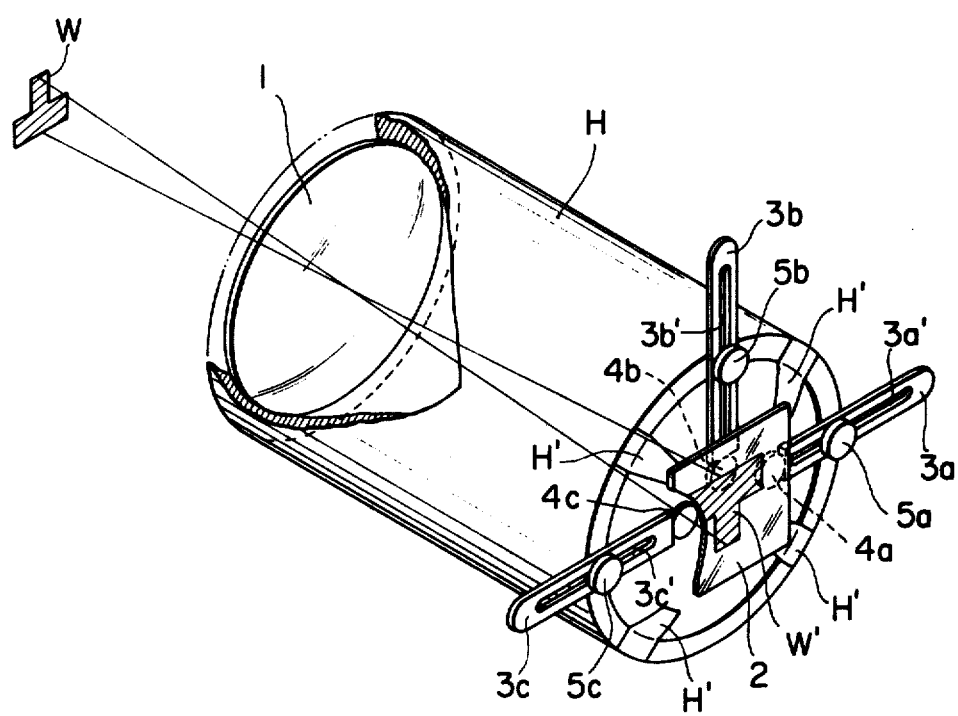
FIG. 1 is a partly sectioned perspective view showing an embodiment of a detecting device according to the present invention.

In FIG. 1, an object W to be examined is projected as a real image on a focusing glass 2 by an objective 1. This objective 1 is secured to the front end of a cylindrical holder H. The focusing glass 2 is positioned in the center of a circular field of view defined by the cylinder by a plurality of supporting members H' secured to the rear end of the holder H. The cylinder H is held in a proper height position by such means as a stand not illustrated and is arranged in a proper place in an automatic assembling line or automatic charging system. Three levers 3a, 3b and 3c are provided adjacently to the surface of the focusing glass in front of the focusing glass 2. Photoelectric elements 4a, 4b and 4c with the light receiving faces directed toward the objective are secured respectively to the tips of the respective levers. Slots 3a', 3b' and 3c' extending in the longitudinal directions are formed in the respective levers. There are provided screws 5a, 5b and 5c screwed into the annular end surface of the cylinder H through the respective slots. Therefore, the respective levers 3a, 3b and 3c can respectively move the photoelectric elements 4a, 4b and 4c to any positions on the focusing glass by respectively loosening the screws 5a, 5b and 5c and can be fixed to the holder H by respectively fastening the screws.

Figure 2:
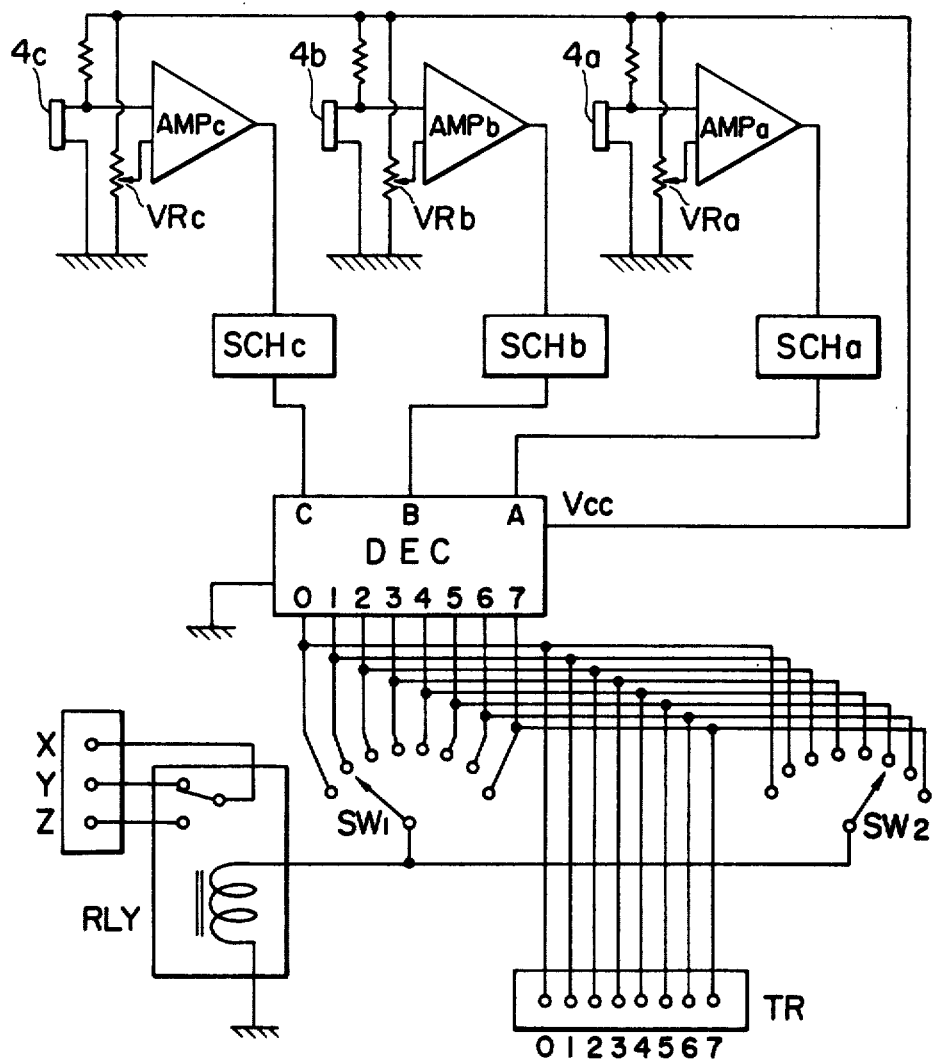
FIG. 2 is an electric circuit diagram showing an embodiment of a signal treating part according to the present invention.

The photoelectric elements 4a, 4b and 4c put out electric signals corresponding to the brightnesses of the image portions on the focusing glass on which they are respectively positioned wherever the image is formed on the focusing glass. As shown in FIG. 2, these output signals are led respectively into input ends on one side of differential amplifiers AMPa, AMPb and AMPc. In this case, as the input levels on the other side of the respective differential amplifiers can be adjusted respectively by variable resistors VRa, VRb and VRc, Schmitt circuits SCHa, SCHb and SCHc can be adjusted by the outputs from the respective differential amplifiers so as to be converted to be on from being off or to be off from being on. As is apparent from this description, the brightness of the image by which the Schmit circuits are to be converted can be set arbitrarily by an operator. When the thus obtained output signals from the respective Schmitt circuits are led respectively to respective binary input terminals A, B and C of a binary-octonary decoder DEC, octonary outputs corresponding to the combinations of the respective inputs will appear respectively at output terminals 0, 1, 2, 3, 4, 5, 6 and 7 of the decoder DEC. Therefore, the operator can determine arbitrarily which output signal should be used. When the above mentioned octonary output appears at a preset output terminal by a selecting switch $SW_1$ or $SW_2$, a relay RLY will be on and the signals will appear at relay terminals X-Z as a result. Symbol TR indicates a terminal board to be used to lead the octonary outputs of the decoder DEC to a watching circuit or the like.

An example of the manner of using the above mentioned detecting device shall be explained in the following.

Figure 3:
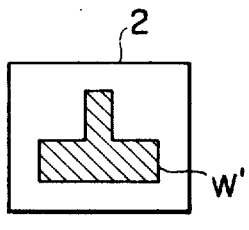
FIG. 3 is an explanatory view showing an example of the image of an object to be examined as focused on a focusing glass.
Figure 4:
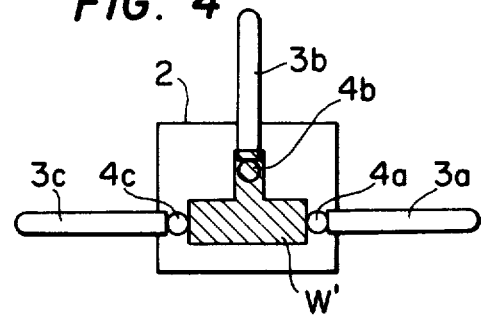
FIGS. 4, 5, 6 and 7 are explanatory views showing respectively relations of images of objects on focusing glasses and photoelectric elements.
Figure 5:
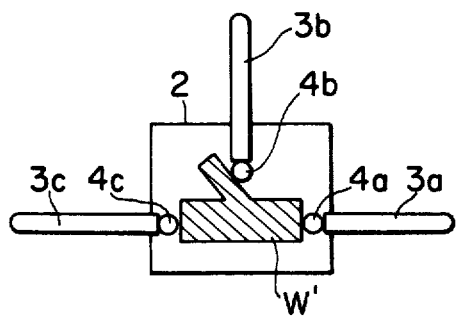
Figure 6:
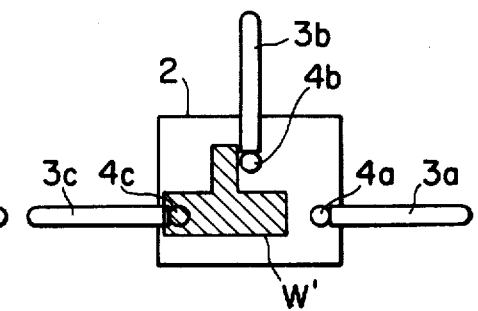
Figure 7:
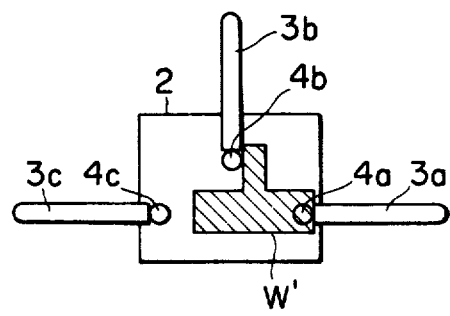

Now, in case, as shown in FIG. 3, an image W' of an object W to be examined as projected on the focusing glass 2 is dark and the background is bright, first of all, the screws 5a, 5b and 5c are unscrewed respectively, the levers 3a, 3b and 3c are moved respectively to set the respective photoelectric elements 4a, 4b and 4c in such positions, for example, as shown in FIG. 4, and then the screws 5a, 5b and 5c are respectively screwed. Thereby, the photoelectric elements 4a and 4c are located on the bright portion and the photoelectric element 4b is located on the dark portion. Next, the variable resistors VRa, VRb and VRc are adjusted so that the outputs of the differential amplifiers AMPa and AMPc are high and the output of the differential amplifier AMPb is low. Thereby, the outputs of the Schmit circuits SCHa and SCHc become high and the output of the Schmit circuit SCHb becomes low and the binary logical input to the decoder DEC is "101"; an output voltage will appear at the output terminal "5" of the decoder DEC. Next, for example, if both selecting switches $SW_1$ and $SW_2$ are connected to the output terminal "5", only when the image W' is in such state as is shown in FIG. 4, the relay RLY will be on and signals will appear at the terminals x-z. Setting of the present device can be completed by the simple operation described above. Examples of the state of object W to be examined are explained in the following. In case, for example, the object to be examined has a bent upper portion as shown in FIG. 5, all the photoelectric elements will be positioned in the "bright parts" on the focusing glass as a result, therefore the input to the decoder DEC will be "111" in the binary system, the octonary output from the decoder DEC will appear at the terminal "7" and the relay RLY will be off. From this, it can be known that the replaced object is different in the shape from the former. Further, in case, the image W' of the object placed in the standard position is deviated leftward as shown in FIG. 6 on the focusing glass, the input to the decoder DEC will be "110" in the binary system and the octonary output will appear at the terminal "6". On the contrary, in case the image W' is deviated rightward as shown in FIG. 7, the input to the decoder DEC will be "110" in the binary system and the octonary output will appear at the terminal "3". Therefore, if the terminals "3", "5", "6" and "7" of the terminal board TR are connected respectively to proper watching circuits, the variations of the shape and state of the object brought to the examining position in turn will be able to be accurately caught.

Figure 8:
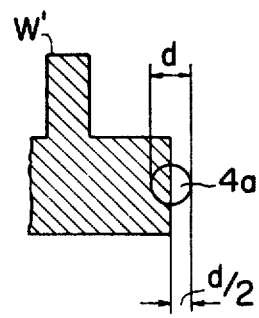
FIG. 8 is a magnified explanatory view showing the case that only half of one photoelectric element overlaps the image of an object.

The resolving power of the present device shall be described in the following. As shown in FIG. 8, if, for the light receiving part diameter d of the photoelectric element (only 4a is shown in the drawing), the outline (the boundary line between the "bright part" and "dark part" on the focusing glass) of the projected image W' is set so as to coincide, for example, with the position of d/2 and, in this state, the variable resistor VRa is adjusted so that the Schmitt circuit SCHa may be on, even if the image W' moves slightly rightward to slightly decrease the area of the "bright part" occupied by the photoelectric element 4a on the entire light receiving area, the Schmitt circuit SCHa will operate, its output will be off and therefore a very high detecting precision will be able to be obtained. In fact, even if the image W' moves for a distance of ⅛ to 1/10 the diameter dimension of the light receiving element, the movement will be able to be detected. The variable resistor can be adjusted so that the Schmitt circuit may not be off in such position of the photoelectric element as is shown in FIG. 8. In such case, the slight leftward movement of the image will be detected by the fact that the output of the Schmit circuit is on.

Figure 9:
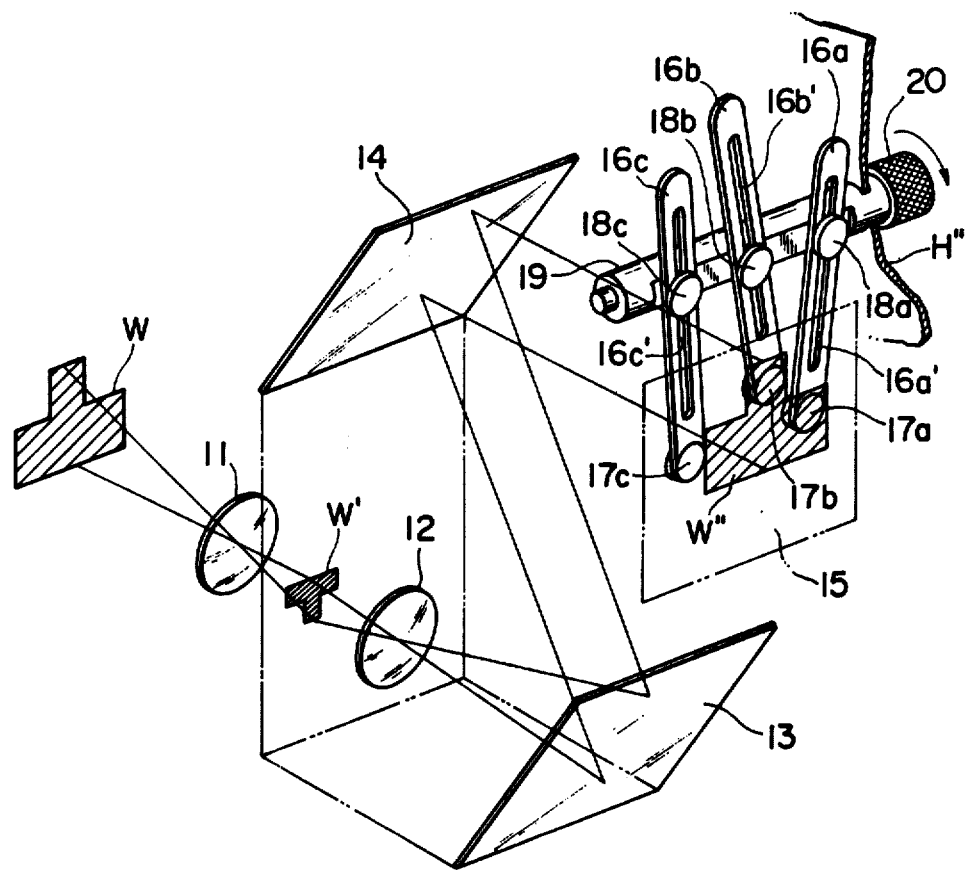
FIG. 9 is a perspective view of an essential part showing another embodiment of detecting device according to the present invention.

FIG. 9 shows another embodiment of the detecting device. This embodiment is different from the embodiment in FIG. 1 in respect that the image of the object to be examined is projected as an erecting image on a focusing glass and the light receiving elements are movable out of the projecting light path by a manual operation. In FIG. 9, the inverted image W' of the object W is first obtained by an objective 11 and is further magnified and projected by a projecting lens 12 to focus a magnified erecting image W'' on a focusing glass 15 through reflecting mirrors 13 and 14 which are used to bend the projecting light path to make the size of the entire device small. Light receiving elements 17a, 17b and 17c are secured respectively to the lower ends of levers 16a, 16b and 16c. The respective levers are movably attached to a shaft 19 by screws 18a, 18b and 18c passed respectively through slots 16a', 16b' and 16c' formed in them. The shaft 19 is rotatably borne by a fixed supporting member H'' and is provided with a knob 20 at the end. It is the same as in the embodiment in FIG. 1 that the respective photoelectric elements 17a, 17b and 17c can be set in any positions on the focusing glass respectively by loosening the screws 18a, 18b and 18c. The levers 16a, 16b and 16c fixed to the shaft 19 by respectively fastening the screws 18a, 18b and 18c can be moved out of the projecting light path by rotating the knob 20 in the direction indicated by the arrow and thereby it is made easy to confirm and observe the image W'' on the focusing glass 15. As the image W'' projected on the focusing glass is a magnified erecting image and the moving direction of the image W'' coincides with the moving direction of the object W to be examined, the image W'' is easy to adjust sensitively. By properly selecting the magnification of the image, the slightest variation of a very small object to be examined can be positively detected.

In each of the above explained embodiments, three photoelectric elements are used but 4 or more photoelectric elements can be also used. Further, a frensnel lens or the like may be used instead of the focusing glass. The signal treating circuit is not limited to that shown in FIG. 2. For example, a plurality of relays can be used on the output side, a connecting cable can be used instead of the selecting switch, each output can be made in an open collector system, a preamplifier can be used as required on the input side and a temperature correcting circuit can be provided. Such various modifications can be made. They all belong to the scope of the present invention.

I claim:

1. A detecting device comprising:
    a focusing glass, having an object side surface, for forming thereon an image of an object to be examined;
    a plurality of photoelectric elements, having binary logical outputs, respectively movably arranged at points adjacent to said object side surface;
    decoder means, having a plurality of inputs connected to said binary logical outputs, for converting said outputs from respective photoelectric elements to higher-order logical outputs and outputting said higher-order outputs on higher-order logical output terminals thereof;
    a plurality of manually operable level adjusting circuit means respectively connected between the outputs of respective photoelectric elements and decoder means inputs for adjusting respective signal levels, constituting brightness levels, of signals input to said decoder means; and
    selecting switch means, connected to said higher-order logical output terminals, for selectively combining said higher-order logical outputs to establish brightness signals of points adjacent the image of said object to be examined.

2. A detecting device according to claim 1 further comprising: a fixed supporting member, a manually operable shaft rotatably supported by said supporting member, and a plurality of levers attached to said shaft and having at the ends thereof said plurality of photoelectric elements, and wherein said plurality of photoelectric elements can be moved while maintaining their selective set positions by rotating said shaft to facilitate observation of said image on said focusing glass.

3. A detecting device according to claim 1 further comprising:
    an optical system for forming the image of the object to be examined on said focusing glass, said optical system comprising an objective lens system and a projecting lens system for projecting an object image formed by said objective lens system to obtain a magnified erecting image.

4. A detecting device according to claim 2 further comprising:
    an optical system for forming the image of the object to be examined on said focusing glass, said optical system comprising an objective lens system and a projecting lens system for projecting an object image formed by said objective lens system to obtain a magnified erecting image.

* * * * *